Patented Dec. 11, 1945

2,390,529

UNITED STATES PATENT OFFICE 2,390,529

HYDRAZINO-1,3,5-TRIAZINO DERIVATIVES OF SUBSTITUTED PHENYLARSENIC COMPOUNDS

Ernst A. H. Friedheim, New York, N. Y.

No Drawing. Application February 3, 1942,
Serial No. 429,402

4 Claims. (Cl. 260—249.5)

This invention relates to condensation products of 1,3,5-triazines with arsenic containing organic compounds, and more particularly to condensation products containing triazino, hydrazino and phenyl-arsenic radicals.

The compounds according to this invention are hydrazino-1,3,5-triazino derivatives of substituted phenyl-arsenic compounds, said derivatives containing one or more hydrazino radicals, and at least one carbon atom of the triazine-ring carrying a radical selected from the group consisting of phenylhydrazino- and anilino-radicals containing a trivalent or pentavalent arsenic atom.

The condensation products according to this invention have the general formula

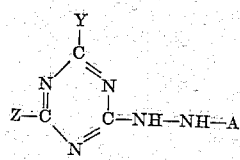

wherein A is a radical selected from a group which in my present application is denoted as "group I." This group consists of H, $$-(C_6H_2-D,E-AsO_3H_2)$$
$$-(C_6H_2-D,E-As=X)$$

and $$-(C_6H_2-D,E-As'=X')$$

and is so meant in the claims. In these formulas radicals D and E are selected from a group, which in my present application is denoted as "group II." This group consists of H, halogen, OH, O—alkyl, alkyl, alkylol, $NO_2$, $NH_2$, NH—alkyl, N—dialkyl, NH—acyl, NH—$NH_2$, NH—NH—acyl, N—acyl—$NH_2$, N—acyl—NH—acyl, N—alkyl—$NH_2$, N—alkyl—NH—alkyl, alkylamin—amino—CO—$NH_2$ and is so meant in the claims; X is a divalent radical selected from the group consisting of O, S, dihalides, sulfur containing groups of the type $=(S-R)_2$, R being a radical capable of carrying a SH-radical; X' is an arsenic radical comprising a trivalent As atom, two valencies of which are connected to As', while its remaining monovalent bond is connected to an atom group which is identical with the entire rest of the molecule to which the monovalent bond of the As' atom in the molecule of the condensation product is connected. When in the above general formula A is hydrogen, the radicals Y and Z may be the same or different. One of the radicals Y and Z is selected from the group denoted in my present application as "group III." This group consist of —NH—$C_6H_2$—D,E—$AsO_3H_2$, —NH—NH—$C_6H_2$—D,E—$AsO_3H_2$, —NH—$C_6H_2$—D,E—As=X, —NH—NH—$C_6H_2$—D,E—As=X, —NH—$C_6H_2$—D,E—As'=X' and —NH—NH—$C_6H_2$—D,E—As'=X', and is so meant in the claims. The other of said radicals Y and Z is selected either from the radicals —NH—$C_6H_2$—D,E—$AsO_3H_2$, —NH—NH—$C_6H_2$—D,E—$AsO_3H_2$, —NH—$C_6H_2$—D,E—As=X, and —NH—NH—$C_6H_2$—D,E—As=X, or from a group which is denoted in my present application as "group IV" and consists of H, OH, halogen, —$NH_2$, —NH—alkyl, —N—dialkyl, —NH—acetyl, —NH—$(CH_2)_n$—OH, —NH—$CH_2$—CHOH—$CH_2$—OH, —NH—$(CH_2)_n$—N—dialkyl, —NH—$(CH_2)_n$—$NH_2$, —NH—$NH_2$, —NH—$C_6H_4SO_3H$, —NH— NH—aryl, —NH—NH—acyl, —N—acyl—NH—acyl, —N—alkyl—$NH_2$, —N—alkyl—NH—alkyl, —alkylamino—amino—CO—$NH_2$, —NH—NOH, NH—aryl, aminoguanidine, semicarbazide, amino-acids, and primary iso- and heterocyclic aromatic amines including thiamin (vitamin B) and is so meant in the claims.

When in the above general formula A is a radical of the formula —$(C_6H_2-D,E-AsO_3H_2)$, —$(C_6H_2-D,E-As=X)$, and —$(C_6H_2-D,E-As'=X')$, the radicals Y and Z may be the same or different, and are selected from the radicals —NH—$C_6H_2$—D,E—$AsO_3H_2$, —NH—NH—$C_6H_2$—D,E—$AsO_3H_2$, —NH—$C_6H_2$—D,E—As=X, and —NH—NH—$C_6H_2$—D,E—As=X, or from the above described group IV.

I have found that organic arsenicals pertaining to the present invention may be prepared according to the following methods:

(a) A 1,3,5-triazine derivative containing at least one halogen is reacted with a phenylhydrazino-arsonic acid according to the equation:

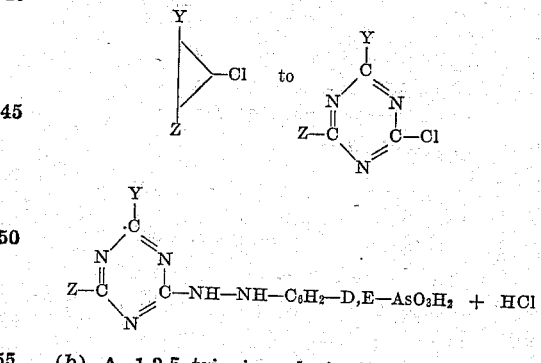

(b) A 1,3,5-triazine derivative containing at least one hydrazino group, and one halogen reacts with an anilino-arsonic acid as follows:

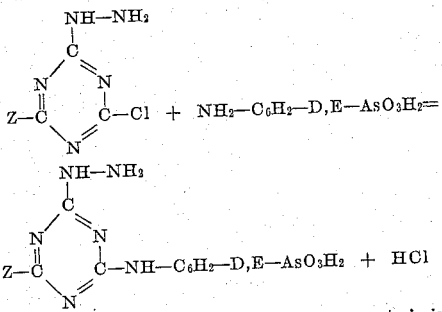

(c) A 1,3,5-triazine derivative containing at least one hydrazino group may be reacted with a halogen-phenyl-arsonic acid according to the equation:

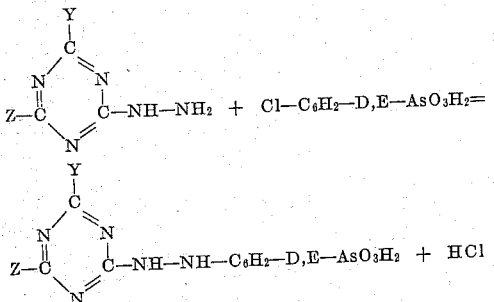

(d) A halogen-triazinyl-arsonic acid described in my co-pending application Ser. No. 310,232 filed Dec. 20, 1939, and containing at least one halogen, or a halogen-triazinyl compound containing trivalent arsenic and described in my co-pending application Ser. No. 422,234, filed Dec. 9, 1941, is treated with hydrazine hydrate.

(e) The $As^V$-containing products according to this invention can be reduced to the corresponding $As^{III}$-compounds by treating said products with $SO_2$ in hydrochloric acid solution in the presence of hydriodic acid as catalyst.

(f) By treating the $As^V$-containing products according to this invention with hypophosphorous acid ($H_3PO_2$) or stannous chloride in hydrochloric acid solution in the presence of hydriodic acid as catalyst, or by treating the same with sodium hydrosulfite ($Na_2S_2O_4$) in neutral or alkaline solution, the corresponding trivalent arseno-compounds, i. e. compounds containing the group —As=As—, are formed.

The equations described above under (a), (b) and (c) are given as examples for purpose of illustration.

When in the above equation Y and/or Z represent halogen, one or both halogens may be substituted, after formation of the condensation product, in one or two steps by one radical or two different radicals selected from the group consisting of $—NH—C_6H_2—D,E—AsO_3H_2$, $—NH—NH—C_6H_2—D,E—AsO_3H_2$,
$—NH—C_6H_2—D,E—As=X$, and $NH—NH—C_6H_2—D,E—As=X$, and from group IV.

I have further found that those condensation products according to this invention, which contain at least one free hydrazino-radical

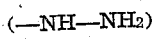

react readily with compounds carrying a carbonyl group

said carbonyl group being capable of reacting with phenylhydrazine to form hydrazones, and with aceto-acetic-esters to form pyrazolones.

The condensation products according to this invention represent valuable, active therapeutic agents in diseases caused by spirochaetes and protozoae, such as syphilis, and African sleeping sickness.

A particular feature of the present invention resides in the fact that it opens large fields of protein and carbohydrate chemistry to arsenic-chemo therapy. Arsenic compounds according to this invention may be combined, by exchange of triazine-halogen, with such important physiological substances, as amino-acids, polypeptides, proteins, guanidine, guanine, adenine, thiamine (vitamin $B_1$). Furthermore, by hydrazone-linkage, arsenic-containing compounds embodying the present invention may be condensed with essential physiological compounds, such as glucose, lactose, vitamin C (ascorbic acid), vitamin $B_2$ (riboflavin), and vitamin K.

The above mentioned formation of pyrazolone derivatives leads not only to new arsenic-containing derivatives of this pharmacologically important compound, but paves the way for new arsenic-containing dyestuffs, as pyrazolone derivatives combine readily with aromatic diazonium compounds to form azo-dyes.

*Example I.*—70 grams of sodium nitrate dissolved in 300 cc. of water are run, with stirring and cooling, into an ice cold solution obtained by dissolving 217 gr. of arsanilic acid in 250 cc. of hydrochloric acid (spec. gr. 1.19) and 1000 cc. of water. The reaction mixture is run slowly, with stirring and cooling into a solution prepared by dissolving 1400 gr. of $Na_2S_2O_4$ and 336 gr. of sodium acetate in 6000 cc. of water. A white crystalline precipitate of p-hydrazino-phenylarsonic acid is formed, which is filtered off, washed with aqueous 10% acetic acid, and redissolved in dilute hydrochloric acid. After boneblacking of the acid solution, it is reprecipitated by addition of sodium acetate, separated by filtration and washed with aqueous 10% acetic acid, alcohol and ether. The compound is soluble in alkali carbonate solutions and in dilute mineral acids. It reduces ammoniacal silver solution. It is insoluble in benzol and ether and dissolves without color in concentrated sulfuric acid.

11.6 gr. of pure p-hydrazino-phenyl-arsonic acid are suspended in 250 cm.³ of water containing 8.8 gr. of sodium bicarbonate, and shaken, at 2° C. with a solution of 9.1 gr. of cyanuric chloride in 100 cc. of chloroform until a sample of the chloroform proves to be free of cyanuric chloride. The chloroform is now separated from the aqueous suspension. The latter is acidified with hydrochloric acid with Congo-red as an indicator. A white precipitate is formed which is separated by filtration and washed with water, alcohol and ether. The precipitate is suspended in 10 times its weight of water and brought into solution, except for a small insoluble residue, by adding sodium bicarbonate up to a slightly alkaline reaction to litmus. The solution showing a slight yellow tint, is boneblacked and filtered. On acidification of the colorless filtrate with sulfuric acid [(2,4)-dichloro-1,3,5-triazinyl-(6)]-p-hydazino-phenyl-arsonic acid precipitates. It is filtered off and washed with water, alcohol and ether.

The compound is soluble in dilute aqueous solutions of sodium bicarbonate, sodium carbonate and ammonia. It precipitates from its alkaline solution on careful acidification with mineral acids. It is soluble in an excess of dilute hydrochloric acid.

It is insoluble in ethanol, acetone, chloroform and ether. It forms a colorless solution in concentrated sulfuric acid, which takes a deep red-violet color on addition of solid sodium nitrate.

It dissolves in 30% nitric acid with a reddish-brown color. It reduces ammoniacal silver nitrate solution.

Stannous chloride added to the solution of the compound in hot hydrochloric acid produces in the presence of hydriodic acid, a yellow, flocculent precipitate.

*Example II.*—1 part of [(2,4)-dichloro-1,3,5-triazinyl-(6)] - hydrazino - phenyl - arsonic acid corresponding to Example I, is dissolved in 30 parts of a 10% aqueous hydrazine hydrate solution at a temperature of 30° C. On acidification with acetic acid, [(2,4)-chloro-hydrazino-1,3,5-triazinyl-(6)]-hydrazino-phenyl-arsonic acid is formed as white precipitate, which is filtered off and washed with aqueous acetic acid and recrystallized out of dilute hydrochloric acid. The compound is soluble in aqueous sodium bicarbonate solution and in an excess of dilute mineral acids, insoluble in acetone and ether. It reduces ammoniacal silver solution and gives with a hot solution of silver nitrate in nitric acid a white, flocculent precipitate. The solution in warm dilute hydrochloric acid gives a yellow precipitate with cinnamic aldehyde.

*Example III.*—One part of [(2,4)-dichloro-1,3,5 triazinyl -(6)]-p-hydrazino-phenyl-arsonic acid is gradually introduced into four parts of a 75% aqueous solution of hydrazine hydrate. On shaking, the substance dissolves while the solution becomes hot and takes a yellow color. After 24 hours, the solution is poured into 50 parts of ethyl alcohol. The hydrazine salt of [(2,4)-dihydrazino -1,3,5-triazinyl -(6)] - p - hydrazino-phenyl-arsonic acid precipitates in form of a yellowish viscous paste which is separated by decantation and washed with ethyl alcohol until all excess of hydrazine hydrate is removed. It is then triturated with 6 parts of diluted sulfuric acid of 20%. The resulting suspension of hydrazine sulfate is chilled and filtered. On careful neutralization of the acid filtrate with aqueous ammonia, free [(2,4-dihydrazino-1,3,5-triazinyl-(6)]-p-hydrazino-phenylarsonic acid is formed as a white micro-crystalline precipitate which is separated by filtration and washed with water, ethyl alcohol and ether.

The compound is soluble in aqueous solutions of sodium bicarbonate, sodium carbonate and ammonia and in dilute mineral acids.

It is only slightly soluble in cold and hot water, insoluble in alcohol, acetone and ether.

It forms a colorless solution in concentrated sulfuric acid which takes a deep red to red-violet color on addition of solid sodium nitrate.

It reduces in the cold Fehling's solution and a solution of silver nitrate in aqueous ammonia.

The hydrochloric acid solution of the compound produces a yellow precipitate with cinnamic aldehyde and a reddish brown precipitate with 1,2-naphthoquinone.

The compound reacts in boiling dilute acetic acid with ethyl acetoacetic ester to form a pyrazolone which couples readily with aromatic diazo compounds.

Stannous chloride added to the solution of the compound in hot hydrochloric acid produces, in the presence of hydriodic acid, a yellow flocculent precipitate.

*Example IV.*—A suspension of one mol of trihydrazino-triazine in a 5% suspension of the disodium salt of one mol of p-bromo-benzenearsonic acid in monochlor benzene is shaken with one gram of copper powder (copper bronze "Natur Kupfer C. Ullmann") for 24 hours at 100° C.

After cooling, the reaction mixture is filtered. The residue is extracted with an aqueous bicarbonate solution. The alkaline solution thus obtained is acidified with hydrochloric acid and filtered.

The acid filtrate yields on exact neutralization with ammonia, a white precipitate of [(2,4) dihydrazino-1,3,5-triazinyl-(6)]-p-hydrazino-phenylarsonic acid which is identical with the compound produced according to Example III.

*Example V.*—1 part of [(2,4)-dichloro-1,3,5-triazinyl -(6)]- p - hydrazino-phenylarsonic acid corresponding to Example I is dissolved in 30 parts of 15% aqueous ammonia, at a temperature of 30° C. On acidification with acetic acid, [(2,4) - chloro-amino -1,3,5 - triazinyl-(6)]-p-hydrazino-phenylarsonic acid is formed as a white precipitate, which is filtered off, washed with dilute acetic acid and recrystallized out of dilute aqueous hydrochloric acid. The compound is soluble in aqueous alkali and an excess of dilute mineral acid. It dissolves without color in concentrated sulfuric acid. It is insoluble in chloroform.

*Example VI.*—One part of [(2,4)-dichloro-1,3,5-triazinyl -(6)]- p-hydrazino - phenylarsonic acid according to Example I is suspended at —40° C. in 20 parts of liquid ammonia. At constant volume, the temperature is allowed to rise slowly to 25° C. The residue remaining after evaporation of the ammonia, is taken up with 20 parts of water. The aqueous solution is filtered and yields on acidification with acetic acid a white precipitate of [(2,4)-diamino-1,3,5-triazinyl -(6)] - p - hydrazino - phenylarsonic acid, which is filtered and recrystallized out of dilute hydrochloric acid.

The compound is soluble in aqueous bicarbonate and in an excess of dilute mineral acid, insoluble in hexane and ether.

The same compound is obtained by treating [(2,4)-chloro-amino-1,3,5-triazinyl-(6)] - p - hydrazino-phenylarsonic acid, described in Example V, with hot concentrated ammonia.

*Example VII.*—One part of [(2,4-chloro-amino-1,3,5-triazinyl-(6)] - p-hydrazino-phenylarsonic acid, described in Example V is treated with a 75% aqueous solution of hydrazine hydrate in a procedure in all ways similar to that described in Example III.

After elimination of the excess hydrazine, as described in Example III, [(2,4)-amino-hydrazino-1,3,5-triazinyl - (6)] - p - hydrazino-phenylarsonic acid is precipitated from a hydrochloric acid solution, by neutralization with ammonia.

The compound forms a white powder, is soluble in aqueous alkali and dilute mineral acids, insoluble in alcohol and ether.

In dilute hydrochloric acid solution it forms a white precipitate on addition of benzaldehyde.

*Example VIII.*—1 part of [(2,4)-dichloro-1,3,5-triazinyl-(6)]-p-amino-phenylarsonic acid described in my co-pending patent application Serial No. 310,232 filed December 20, 1939, is dissolved in 30 parts of ice cold 20% aqueous solution of hydrazine hydrate. The solution is allowed to stand for 8 hours at 25° C. The hydrazine salt of [(2,4)-chloro-hydrazino-1,3,5-triazinyl-(6)]-p-amino-phenylarsonic acid is precipitated by pouring the boneblacked and filtered solution in an excess of ethanol. The precipitate is filtered off, washed with alcohol and brought into solution with 10 times its weight of water on addition of sodium bicarbonate. The slightly alkaline solution is boneblacked and filtered. On acidification with acetic acid the free [(2,4)-chloro-hydrazino-1,3,5-triazinyl-(6)] - p-amino-phenylarsonic acid forms a white micro-crystalline precipitate which is filtered off and washed with dilute acetic acid, alcohol and ether. The compound is soluble in dilute aqueous bicarbonate and an excess of dilute, warm hydrochloric acid. It is insoluble in acetone, chloroform and ether. It reduces warm ammoniacal silver nitrate solution. The warm hydrochloric acid solution reacts with cinnamic aldehyde to form a yellow precipitate.

The same compound is obtained by shaking an 8% solution of 1 mol of arsanilic acid and 2 mols of sodium bicarbonate at 25° C. with 1 mol of finely divided 2,4-dichloro-6-hydrazino-1,3,5-triazine obtained by treating an ice cold ether solution of cyanuric chloride with one equivalent of hydrazine dissolved in ether.

*Example IX.*—3.5 gr. of hydrazine dissolved in 50 cc. of ether are added with stirring and cooling to 20.13 gr. of cyanuric chloride dissolved in 600 cc. of ether and in the presence of 5.3 gr. of anhydrous sodium carbonate. The mixture is shaken, at a temperature not exceeding at any time 0° C., until all cyanuric chloride has disappeared and 2,4-dichloro-6-hydrazino-1,3,5-triazine is formed. The reaction mixture is then added to a solution containing 21.7 gr. of arsanilic acid and 10.6 gr. of anhydrous sodium carbonate in 200 cc. of water. The resulting mixture is vigorously shaken while the temperature is allowed to rise to 33° C., while the ether is permitted to escape. When all primary amine has disappeared, the reaction mixture is adjusted to a reaction alkaline to lithmus, charcoaled and filtered. On acidification of the filtrate with acetic acid, [(2,4)-chloro-hydrazino-1,3,5-triazinyl-(6)]-p-aminophenylarsonic acid forms a white precipitate, which is filtered off, washed with dilute acid, alcohol and ether and recrystallized out of warm dilute hydrochloric acid. The compound is identical with the compound obtained according to Example VIII.

*Example X.*—1 part of [(2,4)-chlorohydrazino-1,3,5-triazinyl-(6)] - p-amino-phenylarsonic acid prepared as described Examples VIII and IX, is treated on the water bath, in a pressure bottle for 2 hours with 2.5 parts of 75% aqueous solution of hydrazine hydrate. The compound goes into solution. On cooling, the hydrazine salt of [(2,4)-dihydrazino-1,3,5-triazinyl-(6)]-p-aminophenylarsonic acid forms a white crystalline precipitate which is filtered off and washed with alcohol and ether.

1 part of this compound is dissolved in 4 parts of warm water. The solution is boneblacked and filtered. On addition of 1 part of anhydrous sodium acetate, the free [(2,4)-dihydrazino-1,3,5-triazinyl - (6) ] - p-amino - phenyl - arsonic acid forms a white crystalline precipitate, which is filtered off and washed with alcohol and ether. The compound is soluble in dilute aqueous alkali, such as solutions of sodium bicarbonate, carbonate, hydroxide and ammonia.

From the concentrated alkaline solution it is precipitated by acetic acid, dilute hydrochloric, or sulfuric acid. It is soluble in an excess of dilute hydrochloric acid. It is insoluble in alcohol, acetone and chloroform.

It reduces ammoniacal silver nitrate solution.

The solution of the compound in warm hydrochloric acid reacts with cinnamic aldehyde to form a yellow precipitate.

In hydrochloric acid solution it forms, on addition of stannous chloride, in the presence of hydroiodic acid a flocculent, yellow precipitate.

The above described compound may also be obtained by replacing both halogens of [(2,4)-dichloro - 1,3,5 - triazinyl-(6)]-p-aminophenylarsonic acid in one step by the hydrazino radical. This can be effected by treating said dichlorocompound with a warm concentrated solution of hydrazine-hydrate.

*Example XI.*—1 part of [(2,4)-chloro-hydrazino-1,3,5-triazinyl-(6)]-p-amino-phenylarsonic acid is treated under pressure, at 50° C. with 20 parts of liquid ammonia.

The residue remaining after the opening and airing of the pressure vessel is dissolved in 10 times its weight of water. The solution is boneblacked and filtered. On acidification with acetic acid, [(2,4) - amino - hydrazino-1,3,5-triazinyl-(6)]-p-amino-phenylarsonic acid forms a white precipitate which is filtered off and washed with dilute acetic acid, alcohol and ether.

The compound is soluble in aqueous sodium bicarbonate solution and in an excess of dilute hydrochloric acid.

It reduces ammoniacal silver nitrate solution.

Dissolved in warm, dilute hydrochloric acid, it forms a white precipitate with benzaldehyde.

Dissolved in warm, dilute hydrochloric acid, it forms a yellow flocculent precipitate on addition of hypophosphoric acid in presence of hydroiodic acid.

*Example XII.*—1 part of [(2,4)-dihydrazino-1,3,5-triazinyl-(6)]-p-hydrazino - phenylarsonic acid described in Example III is dissolved in 50 parts of hydrochloric acid (spec. grav. 1.19) containing 1% of hydroiodic acid. The solution is treated at 70° C. with a current of SO₂ gas. On cooling, a white crystalline precipitate, representing the chlorhydrate of [(2,4) dihydrazino-1,3,5-triazinyl-(6)]-p-hydrazino - phenyldichlorarsine is formed which is filtered off and washed with ice-cold hydrochloric acid.

The precipitate is dissolved in 50 times its weight of airfree water. On careful neutralization with aqueous ammonia, [(2,4)-dihydrazino-1,3,5-triazinyl-(6)]-p-hydrazino - phenyl - arsinoxide forms a white precipitate which is filtered off and washed with air-free ice water. The compound is soluble in dilute hydrochloric acid, insoluble in dilute aqueous bicarbonate of soda, chloroform and benzene.

It dissolves without color in concentrated sulfuric acid. This solution turns to a red-violet tint on addition of sodium nitrate. It reduces Fehling's solution and ammoniacal silver nitrate.

*Example XIII.*—1 part of [(2,4)-diamino-1,3,5-triazinyl-(6)] - p - hydrazino-phenylarsonic acid described in Example VI is dissolved in 10 parts of 10% hydrochloric acid. To the solution are added 5 parts by weight of a solution prepared as follows:

| | Parts by weight |
|---|---|
| Sodium hypophosphite | 6 |
| Water | 2 |
| Hydrochloric acid (spec. grav. 1.19) | 10 |
| Methanol | 40 | are mixed and 0.5 part by volume of 48% hydroiodic acid are added to the filtered solution.

The warm reaction mixture turns yellow on standing, and the arseno compound formed, separates as a yellow powder which is filtered off and washed with methanol.

The product is soluble with yellow color in an excess of dilute warm hydrochloric acid. It is reprecipitated unchanged on neutralization of the acid solution by ammonia. The arseno compound thus prepared has the formula:

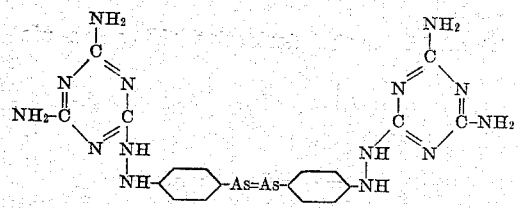

*Example XIV.*—1 part of [(2,4)-dichloro-1,3,5-triazinyl-(6)]-(3',4')-amino-oxy-phenylarsonic acid described in my co-pending application No. 310,232 filed December 20, 1939, is dissolved in 20 parts of ice-cold 20% aqueous solution of hydrazine-hydrate. After standing for 12 hours at 25° C., the solution is poured into 100 parts of ethanol. A white precipitate forms which is separated by centrifuging, washed with alcohol, dried and redissolved in 7 times its weight of water, to which sufficient carbonate of soda is added to make the reaction slightly alcaline to litmus. The solution is boneblacked and filtered. On acidification with acetic acid, [(2,4)-chloro-hydrazino-1,3,5 triazinyl-(6)]-(3'-4') - amino-oxy-phenylarsonic acid forms a white precipitate which is filtered off and washed with ice water, alcohol and ether.

The same compound may be obtained by shaking an 8% solution of 3,4-amino-oxy-phenylarsonic acid and 1½ mol of sodium carbonate at 25° C. with 1 mol of finely divided 2,4-dichloro-6-hydrazino-1,3,5-triazine by a procedure in all ways analogous to the one described in Example IX.

The resulting compound gives all reactions shown by [(2,4)-chloro-hydrazino-1,3,5-triazinyl-(6)]-p-aminophenyl-arsonic acid described in Examples VIII and IX, and, furthermore, its alcaline solution develops a red color on addition of diazobenzenesulfonic acid.

*Example XV.*—1 part of [(2,4)-chloro-hydrazino-1,3,5-triazinyl-(6)]-(3'-4')-amino-oxyphenylarsonic acid obtained as described in Example XIV is suspended in 10 parts of liquid ammonia at −40° C. At constant volume the temperature is brought slowly to 35° C. and is maintained at this level for 8 hours. The residue obtained after blowing off the excess ammonia is dissolved in water. The solution is boneblacked and filtered. On acidification with acetic acid [(2,4)-amino-hydrazino-1,3,5-triazinyl-(6)]-(3',4')-aminooxyphenylarsonic acid forms a white precipitate which is filtered off, washed with water, alcohol and ether.

The compound is soluble in aqueous bicarbonate solution and dilute mineral acids, insoluble in acetone, choloroform and ether. It dissolves without color in concentrated sulfuric acid.

It reduces ammoniacal silver nitrate solution and couples in alcaline solution with diazobenzene sulfonic acid to give a red color.

*Example XVI.*—[(2,4)-dihydrazino-1,3,5-triazinyl-(6)]-(3',4')-aminooxy-phenylarsonic acid is obtained by treating [(2,4)-chloro-hydrazino-1,3,5-triazinyl-(6)]-(3'-4')-aminooxy-phenylarsonic acid, obtained as described in Example XIV, with concentrated aqueous hydrazine-hydrate solution by a procedure in all ways analogous to that described in Examples III and VIII.

The compound shows all the properties described as typical for [(2,4)-dihydrazino-1,3,5-triazinyl-(6)]-p-amino-phenylarsonic acid. Furthermore, it couples in alcaline solution with the diazobenzene-sulfonic acid to give a red color.

*Example XVII.*—3,4-hydrazino-oxy-phenylarsonic acid is prepared by reduction of 3,4-diazo-oxyphenylarsonic acid according to the method described in Example I. The compound is brought to reaction with cyanuric chloride by a procedure in all ways analogous to that described in Example I, to form [(2,4)-dichloro-1,3,5-triazinyl-(6)]-3'-hydrazino-4'-oxy-phenylarsonic acid. This compound gives all the reactions indicated for the dichloro compound corresponding to Example I, and, furthermore, it couples in alcaline solution with diazobenzene-sulfonic acid to form a red azo-dye.

*Example XVIII.*—1 part of [(2,4)-amino-hydrazino-1,3,5-triazinyl-(6)]-(3'-4')-amino-oxy-phenylarsonic acid according to Example XV dissolved in 40 parts of concentrated hydrochloric acid (spec. grav. 1.19) containing 1% of hydroiodic acid, is treated at 60° C. with a current of $SO_2$. On cooling, the dichlorhydrate of [(2,4)-amino-hydrazino-1,3,5-triazinyl-(6)]-(3'.4')-amino-oxy-phenyldichlorarsine forms a white crystalline precipitate.

The compound is soluble in methanol, insoluble in carbontetrachloride. It reduces ammoniacal silver nitrate. Treated with a dilute airfree solution of alcali, it hydrolizes to the corresponding arsinoxyde.

*Example XIX.*—1 mol of [(2,4)-dihydrazino-1,3,5-triazinyl-(6)] (3',4')-amino-oxy-phenylarsonic acid obtained according to Example XVI is dissolved with 1 mol of sodium carbonate to form a 5% solution. This solution is run slowly, with good stirring, into a concentrated aqueous solution of 8 mols of sodium hydrosulfite ($Na_2S_2O_4$) which is kept at a temperature of 35° C. A yellow precipitate is formed which is filtered off and washed with water, alcohol and ether. The compound of the formula

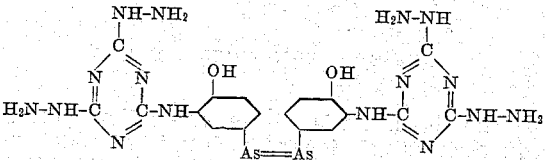

is soluble in caustic soda and in an excess of dilute hydrochloric acid. It is insoluble in alcohol and benzene.

*Example XX.*—1 mol of sodium-p-amido-benzene-sulfonate in a 7% aqueous solution is added to a 5% solution of 1 mol of [(2,4)-dichloro-1,3,5-triazinyl-(6)]-3'-hydrazino-4'-oxy-phenylarsonic acid containing 1 mol of sodium carbonate. The reaction mixture is allowed to stand at room temperature until all aromatic amine has disappeared. The reaction mixture is filtered off. On acidification of the filtrate with hydrochloric acid, a white precipitate is formed which is filtered off and washed with dilute hydrochloric acid and water. The moist compound is treated under pressure at 100° C. with 20 times the quantity of 30% ammonia. After the excess of ammonia has been driven off, the reaction mixture is acidified with hydrochloric acid whereupon [2-amino-.4-sulfanilino-1,3,5 triazinyl-(6)]-3'-hydrazino - 4'-oxy-phenylarsonic acid of the formula:

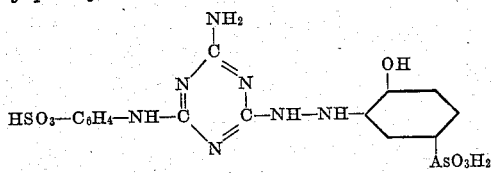

forms a white precipitate.

The compound is recrystallized out of warm water. It is soluble in aqueous bicarbonate and in an excess of dilute hydrochloric acid, insoluble in acetone and ether. Its alcaline solution gives a red color with diazobenzene sulfonic acid.

*Example XXI.*—A 2% solution of 1 mol of [2-amino-4-sulfanilino - 1,3,5 - triazinyl-(6)]-3'-hydrazino-4'-oxy-phenylarsonic acid, obtained as described in Example XX, in warm 5% hydrochloric acid is run under stirring into a 10% solution of 8 mols of stannous chloride in hydrochloric acid (spec. grav. 1.19) containing ½% of hydroiodic acid. On standing, a yellow precipitate is formed, which is filtered off, washed with cold dilute hydrochloric acid, dissolved in dilute sodium hydrate and reprecipitated by acidification with hydrochloric acid. The compound of the formula:

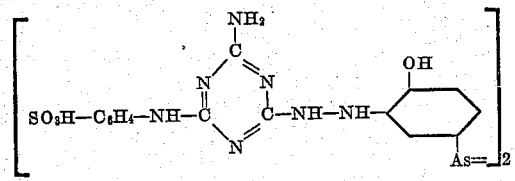

is soluble with yellow color in aqueous solution of sodium carbonate, insoluble in alcohol and ether.

*Example XXII.*—1.3 parts of cinnamic aldehyde are added, with stirring, to 3.4 parts of [(2,4)-amino-hydrazino- 1,3,5 - triazinyl - (6)] - amino-phenylarsonic acid corresponding to Example XI, dissolved in 2 parts of hydrochloric acid and 60 parts of warm water. On cooling a yellow crystalline precipitate of the following formula is formed:

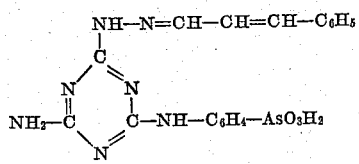

The compound is soluble with yellow color in an aqueous solution of carbonate of soda and slightly soluble in an excess of dilute hydrochloric acid. It is insoluble in acetone and ether.

*Example XXIII.*—1.3 parts of aceto-aceticethyl ester is added to a solution of 3.4 parts of [(2,4) - amino - hydrazino - 1,3,5 - triazinyl - (6)] - amino-phenyl arsonic acid corresponding to Example XI, suspended in 100 parts of 50% glacial acetic acid. The reaction mixture is stirred on the water bath for 2 hours. On cooling the condensation product of the formula:

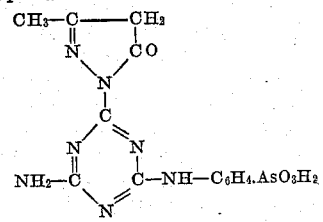

forms a white micro-crystalline precipitate consisting of [2-amino-4-(methyl-pyrazolone)-1,3,5-triazinyl-(6)]-amino-phenyl arsonic acid.

The compound is soluble in carbonate of soda, insoluble in acetone and ether. In alcaline solution it couples with diazobenzene sulfonic acid and forms a yellow dye.

It is to be understood that in the appended claims the term "amino radicals" is used to include —NH₂ radicals as well as the above disclosed substituted amino radicals.

I claim:

1. A 1,3,5-triazine derivative of the formula

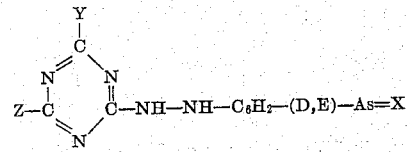

wherein Y and Z are selected from the group consisting of amino, and hydrazino radicals, $C_6$ represents a benzene ring, D and E are selected from the group consisting of H, halogen, —OH, —O—acyl, —O—alkyl, amino and alkyl radicals, and —As=X is selected from the group consisting of —AsO₃H₂ and its salts, —AsO, —AsS and —As=(halogen)₂ radicals.

2. A process for the preparation of a 1,3,5-triazine derivative of the formula

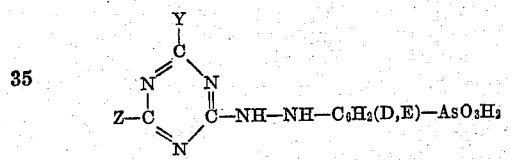

wherein Y and Z are selected from the group consisting of amino, and hydrazino radicals, $C_6$ represents a benzene ring, and D and E are selected from the group consisting of H, halogen, OH, —O—acyl, —O—alkyl, amino and alkyl radicals, said process comprising the step of reacting a 1,3,5-triazine derivative of the formula

with a substituted phenylarsonic acid compound corresponding to the formula

wherein one of T and W is a halogen radical and the other is a —NH—NH₂ radical.

3. A process for the preparation of a 1,3,5-triazine derivative of the formula

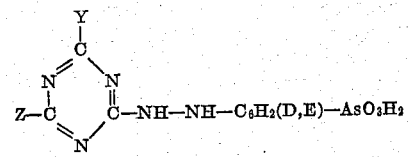

wherein Y and Z are selected from the group consisting of amino, and hydrazino radicals, $C_6$ represents a benzene ring, and D and E are selected from the group consisting of H, halogen, OH, —O—acyl, —O—alkyl, amino and alkyl radicals, said process comprising the step of reacting a cyanuric halide of the formula

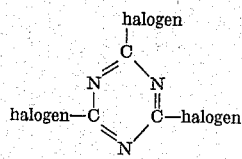

with a phenyl-hydrazino-arsonic acid compound corresponding to the formula $$H_2N-NH-C_6H_2(D,E)-AsO_3H_2$$

and treating the reaction product formed with a substance selected from the group consisting of ammonia, substituted amines and hydrazine hydrate.

4. A process for the preparation of a 1,3,5-triazine derivative of the formula

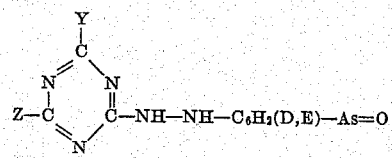

wherein Y and Z are selected from the group consisting of amino, and hydrazino radicals, $C_6$ represents a benzene ring, D and E are selected from the group consisting of H, halogen, —OH, —O—acyl, —O—alkyl, amino and alkyl radicals, said process comprising subjecting a hydrazino-triazino-derivative of a substituted phenyl arsonic acid compound corresponding to the formula

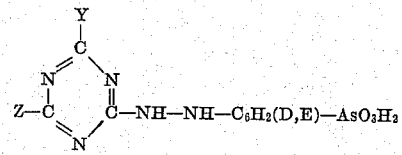

to the action of $SO_2$ in hydrochloric acid solution in the presence of hydriodic acid.

ERNST A. H. FRIEDHEIM.